United States Patent [19]
Muller

[11] 3,785,028
[45] Jan. 15, 1974

[54] PROCESS FOR THE PRODUCTION OF HUBS FOR SPIRAL SPRINGS OF TIMEPIECES

[75] Inventor: Wolfgang Muller, Schramberg, Germany

[73] Assignee: Firma Carl Haas, Schramberg, Germany

[22] Filed: Feb. 9, 1972

[21] Appl. No.: 224,887

[30] Foreign Application Priority Data
Feb. 10, 1971 Germany.......................... 2106188

[52] U.S. Cl.................. 29/177, 29/417, 29/557, 29/DIG. 47, 58/115
[51] Int. Cl............................................ B23p 13/00
[58] Field of Search.................. 29/177, DIG. 47, 29/417, 178, 412, 557, 558; 58/115

[56] References Cited
UNITED STATES PATENTS
| | | | |
|---|---|---|---|
| 1,860,605 | 5/1932 | Baldwin, Jr.......................... | 29/157 |
| 2,391,816 | 12/1945 | Bennett, Jr.......................... | 58/115 |
| 3,121,307 | 2/1964 | Greiner............................. | 29/177 X |
| 3,124,868 | 3/1964 | Zacaroli............................ | 29/412 X |
| 3,624,883 | 12/1971 | Baehni.............................. | 29/177 |
| 3,661,480 | 5/1972 | Forschner et al................. | 29/558 X |

FOREIGN PATENTS OR APPLICATIONS
| | | | |
|---|---|---|---|
| 353,681 | 5/1961 | Switzerland........................ | 58/115 |
| 1,138,677 | 1/1969 | Great Britain...................... | 58/115 |
| 1,221,153 | 7/1966 | Germany........................... | 58/115 |

*Primary Examiner*—Charles W. Lanham
*Assistant Examiner*—Victor A. DiPalma
*Attorney*—Arnold B. Christen et al.

[57] ABSTRACT

Hubs for supporting the spiral springs used in timepieces are produced in rough-finished condition by extruding an elongated piece of metal having a cross-section determined by empirical formula which corresponds substantially to the cross-section of the desired fine-finished hub, from which a series of individual hubs, in practically finished condition, is produced by transversely sectioning the extruded material.

5 Claims, 4 Drawing Figures

PROCESS FOR THE PRODUCTION OF HUBS FOR SPIRAL SPRINGS OF TIMEPIECES

The invention relates to a process for the production of hubs for spiral springs for attachment to the balance wheel arbor in timepieces by means of extruding a raw material and cutting off the finished hub from the raw material.

Hubs for spiral springs have been known where the spiral spring is attached to an arm projecting radially from the hub and where another projection, likewise projecting radially and diametrically opposing the arm, has been provided for the balancing of the hub, which projection usually includes a so-called regular slot, as is disclosed in FIG. 1 of Belgian Pat. No. 581,126. The production of these hubs for spiral springs usually is accomplished by using round bars made of brass or some other suitable metal, whereby at the end of the bar first of all the shape of the hub with the projecting arms and projections and including the regulating slot is produced by machining away excess metal and then the finished hub is cut off from the bar. In this case, we are dealing with a complicated, time consuming process which can be carried out only with the aid of expensive automatic machine tools and, moreover, causes a considerable waste of material. In the case of the customary method of manufacture, it is necessary, moreover, to carry out a balancing of the hub either during production of the hub or subsequently to it.

The present invention has for its object the provision of a simple process which will save material and in which especially the balancing of the hub can be carried out easily.

According to the invention, this object will be achieved by starting with a drawn profiled material, the cross sectional shape of which corresponds essentially to the cross sectional shape of the desired roughly balanced hub, by processing this profiled material essentially only with a cutting tool serving for fine processing which is dimensioned in such a way that it will result at the same time in a fine balancing of the resultant series of individual hubs.

The subsequent description of preferred embodiments of the invention serves for further explanations in conjunction with the attached drawings.

Figure 1:
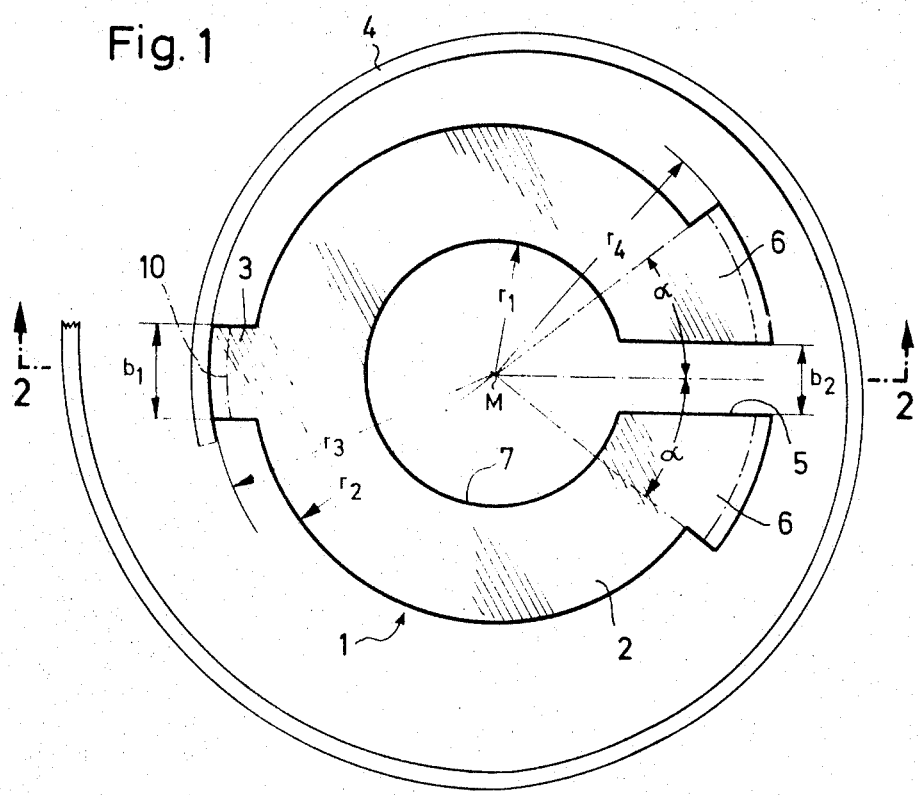
FIG. 1 shows a top view of a hub for a spiral spring produced in accordance with the invention with the spiral spring attached to it.

The spiral spring hub 1 shown in FIG. 1 has an annular base body 2 from which on one side a tongue, bridge, or arm 3, projects. On arm 3 a spiral spring 4 of an Archimedean shape is attached for example by way of gluing, soldering, or welding. In order to guarantee a definite emergence without tension of the spring from hub 1, and in order to assure uniform operation and rotary movement of the balance wheel connected with hub 1, it will be advantageous to impart an Archimedean shape to the outside surface of arm 3 receiving the spring 4. Opposite arm 3 is a so-called regulating slot 5 which extends from the outside of a pair of sector shaped projections 6 opposite arm 3 to an inside bore 7 of the base body 2 of the hub. The center of bore 7 is designated by M. By means of bore 7, the hub 1 is mounted in a known manner with a snug fit on the shaft of a balance wheel.

In FIG. 1, the reference $b_1$ signifies the width of arm 3, $b_2$ the width of slot 5, $r_1$ the radius of bore 7, $r_2$ the outside radius of base body 2 of the hub, $r_3$ the radius of arm 3 (in the case of an Archimedean shape, the approximate radius), $r_4$ the radius of the sector shaped projections 6 and $\alpha$ half the angle across which projections 6 extends.

Figure 2:
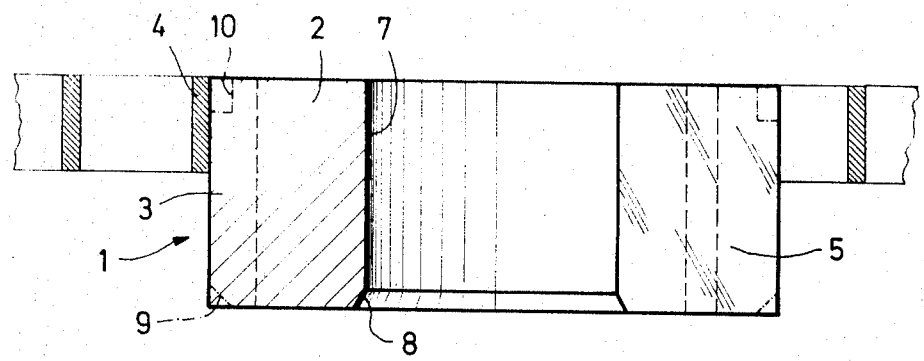
FIG. 2 is a sectional view along the line 2—2 in FIG. 1.

According to the invention, the hub shown in FIG. 2 is made from a drawn profiled material of metal, for example, brass, etc., the cross sectional surface of which corresponds essentially to the final shape of the hub for the spiral spring, as is apparent from FIG. 1. In other words, the profiled material on its outside has an axially extending rib-shaped projection corresponding to arm 3 on the finished hub and axial projections 6 serving for the balancing of arm 3. Moreover, in the case of use of a hollow profile, the inside bore 7 of hub 1 with the slot 5 can be already provided in the drawn material. In this manner, the rough cutting work customary heretofore is omitted, which, on the other hand, is necessary if one starts with a round bar. Furthermore, the hub which results from the previously given shape of the raw material is already roughly balanced so that in the subsequent fine processing of the raw material all that is needed is merely a fine balancing. This will be achieved effectively by properly forming the slot 5 because the fine finishing tool or, the tool which produces this slot, such as a small compass saw or metal slitting saw, is dimensioned in such a way that at the same time the required fine balancing will be assured through cutting away of more or less material.

As a result of the provision of the proper width of slot $b_2$, it furthermore is possible to compensate for changes of the mass which might cause unbalance, which may develop as a result of sloping facings 8, chamferings 9 or special shapes 10 at the seat of the spring in the area of arm 3 or on slot 5.

In the preliminary calculations for the development of a profiled material suitable for the forming of the hubs, the following formula has been found to be useful:

$$b_2 = 4/3 \cdot \sin\alpha \cdot r_4{}^3 - r_2{}^3/r_4{}^2 - r_1{}^2 - b_1 \cdot r_3{}^2 - r_2{}^2/r_4{}^2 - r_1{}^2$$

When the values for $b_1$, $r_1$ to $r_4$ and $\alpha$ are given first, it will thus be possible to calculate the width $b_2$ of the slot. The expressions $r_3$ and $r_4$, as well as $\alpha$ can be selected in such a way that there will be no danger of contact between the spiral spring 4 and projection 6 during swiveling or twisting of the balance system.

The most important advantage of the production process according to the invention is to be seen in that the hub for a spiral spring can be produced from drawn profiled material. With this the processing expenditure will be reduced to a minimum, especially in the case of simple basic hub bodies, as used in many cases, production costs being lowered to such a point as was not considered possible heretofore. Despite the simplified method of production, the spiral spring hub can be balanced whenever the profile is predetermined according to, for example, selection of suitable expressions $r_3$, $r_4$, $b_2$ and $\alpha$ by means of the above mentioned equation. A spiral spring hub without a regulating slot 5 can be produced according to the invention most simply. In most cases, the possibility also exists of selecting the radius $r_3$ equal to radius $r_4$, which also makes the drawing of the profiled material easier. The production of the profiled material, on which the process according to the invention is based, will be facilitated furthermore if a symmetrical profile is used, especially a profile, the cross sectional plane of which has one or more planes of symmetry.

Once the proper cross-sectional configuration of the spring-supporting hub has been determined, all that is necessary is to provide a suitable formed die to produce an elongated extrusion having the corresponding cross-section. The length of the extruded material would preferably be a multiple of the axial thickness of a single hub so that no excess material would remain after a series of hubs have been formed by transverse sectioning of the extrusion. Finally, as previously stated, only a minimum of fine finishing of each hub is necessary because the dimensioning of the elongated extrusion in the beginning eliminates rough finishing steps.

Figure 3:
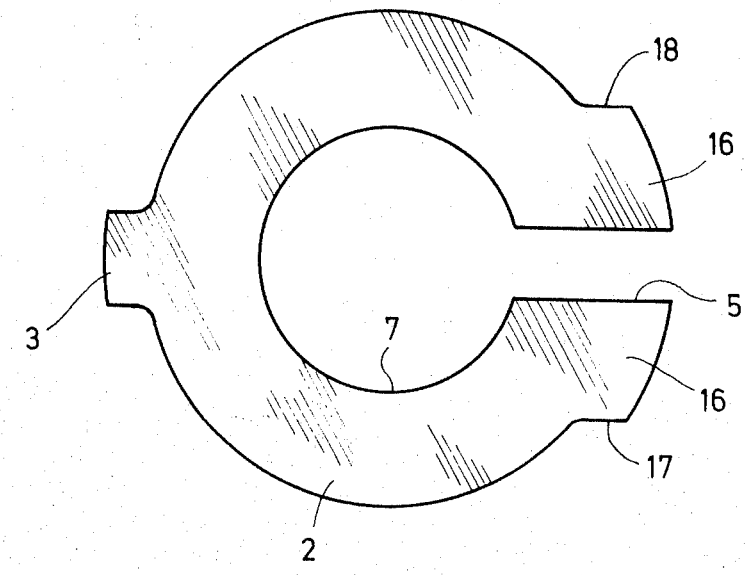
FIG. 3 shows another embodiment of a hub for a spiral spring produced according to the invention and FIG. 4 is a perspective view of a drawn hollow profiled material, used as raw material for the production of hubs for a spiral spring.
Figure 4:
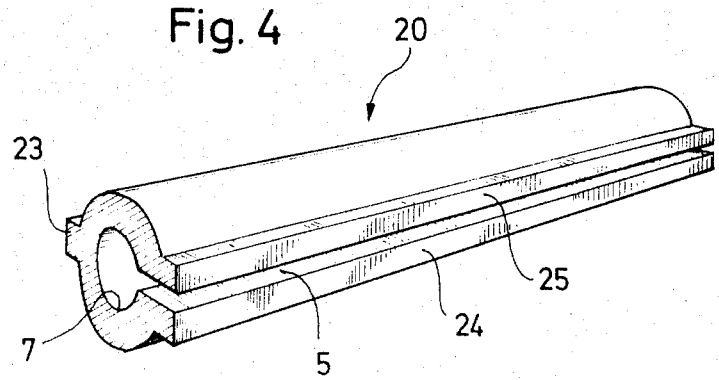

A modified form of spiral spring hub produced according to the invention is shown in FIG. 3. In the case of this embodiment, the projections 16 containing regulating slot 5, which is opposite to arm 3, has lateral surfaces 17 and 18, which, similarly to the lateral surfaces of arm 3, run parallel to a diameter of the hub (and to the inside surfaces of slot 5). As a result of this, the production of the drawn profiled material, serving according to the invention as raw material and which is shown for example in FIG. 4, will be particularly simple. In FIG. 4, one can recognize the hollow profiled material made of a suitable metal, which, as a whole, is designated with reference number 20 and which on its outside in each case has radially projecting, axially extending parallel ridges 23, 24, and 25, which on the finished hub constitute the arm 3 or the projection 16 (or in the case of the embodiment according to FIG. 1, projection 6). Between ridges 24 and 25 lies the slot 5. If a spring seat of an Archimedean shape is desired on arm 3 of the finished hub, then this Archimedean shape advantageously can be produced by properly shaping the die used during the drawing process for the profiled material to produce ridge 23.

Instead of a hollow profiled material, a solid material can also be drawn, in which case the inside bore can be drilled in the hubs after separation from the extruded material.

I claim:

1. Process for producing hubs for attaching spiral springs to the arbor of a timepiece balance wheel comprising the steps of extruding a length of material having a predetermined cross-sectional configuration substantially identical with that of a finished hub, said cross-sectional configuration including a pair of radially outwardly projecting longitudinally extending ridges disposed on opposite sides of the exterior of said length of material and also defining an axially extending generally concentric bore to frictionally engage with an arbor, severing said length of material along axially spaced transverse planes to provide a series of substantially finished hubs, and removing material to provide an axially aligned radially directed slot in said one ridge to obtain final balancing of a hub, the width of said slot corresponding to the formula:

$$b_2 = 4/3 \cdot \sin \alpha \cdot r_4^3 - r_2^3/r_4^2 - r_1^2 - b_1 \cdot r_3^2 - r_2^2/r_4^2 - r_1$$

wherein $r_1$ is the radius of said bore, $r_2$ is the radius of the exterior of said elongated material between said pair of ridges, $r_3$ is the radius of the exterior surface of said ridge provided to support a spiral spring, $b_1$ is the circumferential width of said ridge to support a spring, $r_4$ is the radius of the exterior surface of the ridge opposite to said spring-supporting ridge, and $\alpha$ is equal to one-half of the angle subtended by the respective outside circumferential faces of the ridge provided with said radial slot.

2. The process of claim 1, which includes the step of removing an amount of material circumferentially balanced with respect to an arbor during said final balancing.

3. The process of claim 1, which includes the step of providing an exterior surface on one of said ridges which defines an Archimedian spiral with respect to said bore to support a spiral spring.

4. The process of claim 1, wherein at least one axially aligned plane through a finished hub defines areas symmetrically disposed with respect to said axis.

5. The process of claim 4, wherein said respective outside circumferential faces of the ridge provided with said slot and the respective sides of the spring supporting ridge are respectively defined by planes parallel to each other and to a plane passing through the axis of the hub.

* * * * *